United States Patent [19]

Weddigen et al.

[11] Patent Number: 5,492,661

[45] Date of Patent: Feb. 20, 1996

[54] PROCESS FOR PRODUCING A CASTING CERAMIC

[75] Inventors: Gert Weddigen; Paul Szasz, both of Heidelberg; Axel Kranzmann, Stuttgart, all of Germany

[73] Assignee: ABB Patent GmbH, Mannheim, Germany

[21] Appl. No.: 358,772

[22] Filed: Dec. 19, 1994

[30] Foreign Application Priority Data

Dec. 17, 1993 [DE] Germany .......................... 43 43 121.6

[51] Int. Cl.⁶ .................................................. B29B 7/82
[52] U.S. Cl. .......................... 264/109; 264/122; 264/128; 428/331
[58] Field of Search ........................... 264/109, 122, 264/128; 428/331

[56] References Cited

U.S. PATENT DOCUMENTS

| | | | |
|---|---|---|---|
| 4,251,576 | 2/1981 | Osborn et al. | 428/331 |
| 4,735,974 | 4/1988 | Mandorf | 523/141 |
| 5,028,362 | 7/1991 | Janney et al. | 264/25 |

*Primary Examiner*—Robert A. Dawson
*Assistant Examiner*—Kenneth M. Jones
*Attorney, Agent, or Firm*—Herbert L. Lerner; Laurence A. Greenberg

[57] ABSTRACT

A process for producing a casting ceramic including water glass and a powder containing silicon and aluminum, includes mixing epoxy resin based on bisphenol-A into a casting ceramic to reduce open porosity. The casting ceramic is subsequently subjected to at least one heat treatment.

7 Claims, No Drawings

PROCESS FOR PRODUCING A CASTING CERAMIC

BACKGROUND OF THE INVENTION

Field of the Invention

The invention relates to a process for producing a casting ceramic including water glass and a powder containing silicon and aluminum.

Casting ceramics are used in the manufacture of electrical insulation. However, they are also suitable for the production of components such as housings and switches. The casting ceramic is a low-viscosity mixture of a highly alkaline water glass phase containing potassium or sodium and an aluminosilicate powder mixture which contains silicon and aluminum in a ratio between 2 and 5. The casting ceramic sets in a polycondensation reaction at temperatures below 100° C. over a period of 2 to 6 hours to give yield a solid body. In the setting reaction, up to 20% by weight of water is formed, and that has to be removed in a drying process at a maximum of 200° C. The casting ceramic is inorganic and can be exposed long-term to high temperatures, after curing and drying. However, a disadvantage of drying is that the water being formed leaves behind it a continuous open porosity of up to 30%. In a moist environment, water can be taken up in the open pores as a result of capillary action and the hygroscopic properties of the surface, which the casting ceramic has, and that leads to impairment of the insulation properties. The continuous porosity reduces the dielectric strength of the casting ceramic which reduces its properties as an insulator.

In German Published, Non-Prosecuted Application DE 41 10 223 A1, it is proposed that the pores be filled with a liquid which is subsequently cured, in order to eliminate the porosity. That process is relatively complicated and can only be carried out with difficulty for large components.

SUMMARY OF THE INVENTION

It is accordingly an object of the invention to provide a process for producing a casting ceramic, which overcomes the hereinafore-mentioned disadvantages of the heretofore-known methods of this general type and in which the porosity is negligibly small.

With the foregoing and other objects in view there is provided, in accordance with the invention, a process for producing a casting ceramic including water glass and a powder containing silicon and aluminum, which comprises mixing epoxy resin based on bisphenol-A into a casting ceramic to reduce open porosity, and subsequently subjecting the casting ceramic to at least one heat treatment.

In comparison with organic plastics which are used as insulators or for the manufacture of housings, the casting ceramic has the advantages of higher heat resistance, non-combustibility as well as resistance to UV radiation. Furthermore, the manufacturing processes which are customary for plastics can be used. In comparison with sintered ceramics, the casting ceramic has the advantage of not needing high sintering temperatures, so that lower energy consumption is required for production. In addition, the manufacture allows a substantially higher dimensional accuracy, since upon hardening there is a shrinkage of less than 1%, which is very small in comparison.

In accordance with another mode of the invention, a cross-linkable, fluid organic resin, preferably an epoxy resin based on bisphenol-A, is mixed into the casting ceramic prior to curing. The mixing ratio is 70% by weight of casting ceramic and at most 30% by weight of epoxy resin, based on the total weight of the casting ceramic.

In accordance with a further mode of the invention, further additives in amounts on the order of less than or equal to 5% can be added. Inter alia, these should effect an acceleration of cross-linking, an improvement in processability and an improvement in the moisture resistance. In order to accelerate the cross-linking, use is preferably made of tertiary amines, for example dimethyl-benzyl-amines.

In accordance with an added mode of the invention, improved processability of the casting ceramic is effected by the addition of polyhydric alcohols. Glycerol is particularly suitable for this purpose.

In accordance with an additional mode of the invention, the moisture resistance is achieved by the addition of solvent-free silicone resin. It has been found that it can be advantageous to replace from 25 to 30% by weight of the above-mentioned epoxy resin with solvent-free silicone resin. This enables production of a casting ceramic which has a very high heat resistance and a strong hydrophobicity even when the porosity of the casting ceramic is above 10%.

After mixing with the possible additives, the casting ceramic is finished by subjecting it to a shaping process at room temperature and then curing it. In accordance with yet another mode of the invention, the curing is carried out by heat treatment for from 2 to 6 hours at 80° C. and subsequently for from 8 to 15 hours at 160° C. The casting ceramic sets like all casting ceramics that are already known, while the epoxy resin chains cross-link both among one another and also partly with the surface of the casting ceramic. The cross-linking of the epoxy resin occurs by polyaddition of the macromolecules of this resin. The cross-linking is effected by the casting ceramic which acts as a catalyst. The cross-linked epoxy resin forms a coherent network in the casting ceramic, closing and mostly filling the continuous open porosity. The water formed in the condensation of the casting ceramic is partly consumed in the cross-linking of the resin. The remainder is given off to the outside. The casting ceramic which is thus produced has an open porosity of less than 15%. Depending on the processing method, it can be less than 2%. The casting ceramic of the invention can be exposed long-term to temperatures of from 250° to 300° C. The dielectric strength is greater than 6 kV/mm. It is usually from 8 to 15 kV/mm. The specific resistance at room temperature is $10^{15}$ Ohm×cm. The electric loss factor at 50 Hz is from 0.006 to 0.02.

The casting ceramic of the invention can be processed further in many ways. It can be cast, injected or pressed to yield components. In addition, it can be reinforced with fibers and processed into laminates. The casting ceramic of the invention is particularly suitable for producing spacers and insulation for transformers and switches, for manufacturing components for intermediate-voltage and low-voltage engineering, as well as for manufacturing housings, spark arresters, fire alarm systems, domestic insulators, distributor boxes, power points, intermediate-voltage switches and mounts. In addition, it can be used as a substitute for conventional materials such as epoxy resins, polyesters or polyurethane or sintered ceramics such as porcelain.

In accordance with yet a further mode of the invention, there is provided a process which comprises mixing a material selected from the group consisting of oxide ceramics in the form of aluminum oxide, zirconium dioxide, magnesium oxide, silicon dioxide and beryllium oxide, and non-oxide powders in the form of aluminum nitride, silicon nitride, silicon carbide, tungsten carbide, boron carbide, titanium carbide and molybdenum carbide having an average particle size between 1 and 500 µm, into the still-liquid casting ceramic as fillers.

In accordance with a concomitant mode of the invention, there is provided a process which comprises mixing fillers in the form of short fibers of glass selected from the group consisting of aluminum oxide, silicon dioxide, carbon and silicon carbide having a length of from 0.15 to 50 mm, into the still-liquid casting ceramic.

Other features and steps which are considered as characteristic for the invention are set forth in the appended claims.

Although the invention is described herein as embodied in a process for producing a casting ceramic, it is nevertheless not intended to be limited to the details described, since various modifications and structural changes may be made therein without departing from the spirit of the invention and within the scope and range of equivalents of the claims.

The construction and method of operation of the invention, however, together with additional objects and advantages thereof will be best understood from the following description of specific examples.

Referring now to the steps of the method in detail, it is noted that the production of the casting ceramic starts from a low-viscosity mixture including 40% by weight of water glass, which contains 25% by weight of $K_2O$ and 16% by weight of $SiO_2$ and has a pH of 15 and a viscosity of 15 mPas. To this water glass, 60% by weight of a powder mixture containing $SiO_2$ and $Al_2O_3$ as well as a crystalline $Na_2SiF_6$ phase in a proportion of 20%, are added. A ratio of $SiO_2:Al_2O_3$ is selected so as to be between 4 and 6. The particle size of the powder is from 1 to 10 µm. The mixture of powder and water glass is produced by means of stirring and cooling to 10° C. In order to produce a casting ceramic having a porosity which is below 15%, 17% by weight of epoxy resin based on bisphenol-A is mixed into the above-described mixture of water glass and powder. In order to obtain a casting ceramic which is heat resistant up to 300° C., an additional 5% by weight of a solvent-free silicone resin is added to this mixture. The percentages by weight that are given are based on the total weight of the casting ceramic. The still uncured casting ceramic can be used for the manufacture of components which are cast, for example. For this purpose, this casting ceramic is cast into a mold and cured for 4 hours at 80° C. Since the epoxy resin component is still partially liquid after this first heat treatment, it is followed by a further heat treatment at 160° C. for 8 hours. After this second heat treatment, the component is completely dry and has an open porosity of only 11%.

The still-liquid casting ceramic with an addition of epoxy resin can also be used for injection molding. For this purpose, it is admixed with additional fillers. Suitable fillers are oxide ceramic powders in the form of aluminum oxide, zirconium dioxide, magnesium oxide, silicon dioxide or beryllium oxide as well as non-oxide powders in the form of aluminum nitride, silicon nitride, silicon carbide, tungsten carbide, boron carbide, titanium carbide or molybdenum carbide having an average particle size between 1 and 500 µm. The fillers being mixed in can also be short fibers which have a length that is between 0.15 and 50 mm and which are made of glass, aluminum dioxide, silicon dioxide, carbon or silicon carbide. This allows the properties such as viscosity, strength, hardness and dielectric strength to be varied and the porosity to be reduced.

Stirring in 28% by weight of aluminum oxide powder and 28% by weight of aluminum oxide fibers in 44% by weight of still-liquid casting ceramic containing an addition of epoxy resin, can likewise produce an injection molding compound. The aluminum oxide powder has an average particle size of 18 µm.

The fibers of aluminum oxide have a length of 0.5 mm and a diameter of 0.01 mm. Everything is thoroughly mixed while cooling to 10° C. The paste-like composition thus obtained is charged into a non-illustrated plunger press and injected under pressure into an evacuated mold. The mold is heat treated for 5 hours at 80° C. The component is subsequently taken from the mold and subjected to a further heat treatment at 160° C. for 10 hours. The finished component has an open porosity of only 12%.

Plates are produced starting from the casting ceramic containing an addition of epoxy resin described in the introduction, with 33% by weight of solvent-free silicone resin being additionally mixed in. The material is subsequently cast into a plate mold and cured at 80° C. for 4 hours. The plate is subsequently taken from the mold and heated to 200° C. at a heating rate of from 1° C. to 2° C. per minute and then dried for 2 hours at 200° C. A plate thus produced has an open porosity of 12% and is, in addition, water-repellent. The plate can be used in switches or spark arresters as arc-resistant shielding up to above 300° C.

Laminates can also be produced by using the casting ceramic of the invention. For this purpose, the liquid casting ceramic containing the above-specified proportion of epoxy resin is used as a starting material. This still-liquid casting ceramic mixture is used to impregnate 8 glass fiber mats which have dimensions of 10×10×0.02 cm, for example. The glass fiber mats which have been soaked through are laid on top of one another and pressed between two steel plates. Under continuous pressing, the laminate is cured in 4 hours at 80° C. and subsequently further dried at 160° C. for 10 hours. The laminate which is thus produced has a thickness of 2 mm and an open porosity of 15%. It can be used as an insulator plate, as a spacer or as a housing element or cover of a housing.

Furthermore, the casting ceramic can be used for making insulator pipes or insulating layers of transformers. For this purpose, glass fiber rovings are impregnated with the above-described liquid casting ceramic, which can contain further additives besides the epoxy resin. The roving is subsequently wound in at least 5 layers around a mandrel. Each layer preferably has a thickness of from 0.1 to 0.4 mm. Applied onto this first insulation layer is a transformer-forming wire winding which is adjoined by another insulation layer. In order to further reduce the porosity of the casting ceramic, it is possible to precure each applied layer by means of a non-illustrated heating device. The insulation layers which are wound onto the mandrel are preferably predried at a temperature between 60° C. and 90° C. In order to accelerate the precuring of the insulation layers, it is possible for the mandrel itself to be constructed as a heating element and thus to additionally heat the insulation layers from the inside. The cross-linking of the epoxy resin can, in addition, be accelerated by the addition of a UV-sensitive activator. After irradiation with UV radiation, this effects an accelerated self-cross-linking of the epoxy resin at low temperatures. The activator is added during the production of the casting ceramic mixture. The quantity is 1 to 2% by weight, based on the total quantity of the casting ceramic used. The material remains processable for from 1 to 2 hours thereafter before curing commences. In order to increase the effectiveness of the insulation layer, it is possible to embed mica or plastic films in the insulation. The measures described herein for accelerated curing of the casting ceramic or for better cross-linking of the epoxy resin can also be used in all other above-described production processes, insofar as the manufacturing procedure allows.

We claim:

1. A process for producing a casting ceramic comprising water glass and a powder containing silicon and aluminum, comprising the steps of:
   a) mixing the water glass and the powder to form a mixture,
   b) mixing epoxy resin based on bisphenol-A into the mixture to form the casting ceramic, and
   c) subjecting the casting ceramic to at least one heat treatment for partially curing the casting ceramic.

2. The process according to claim 1, which further comprises mixing at most 30% by weight of epoxy resin based on bisphenol-A, based on the total weight of the casting ceramic, into the partially cured casting ceramic, to reduce the open porosity.

3. The process according to claim 1, which further comprises mixing 5% by weight of solvent-free silicone resin into the partially cured casting ceramic, to increase heat resistance and moisture resistance.

4. The process according to claim 1, which further comprises mixing a material selected from the group consisting of oxide ceramics in the form of aluminum oxide, zirconium dioxide, magnesium oxide, silicon dioxide and beryllium oxide, and non-oxide powders in the form of aluminum nitride, silicon nitride, silicon carbide, tungsten carbide, boron carbide, titanium carbide and molybdenum carbide having an average particle size between 1 and 500 μm, into the partially cured casting ceramic as fillers.

5. The process according to claim 1, which further comprises mixing fillers in the form of short fibers of glass selected from the group consisting of aluminum oxide, silicon dioxide, carbon and silicon carbide having a length of from 0.15 to 50 mm, into the partially cured casting ceramic.

6. The process according to claim 1, which comprises curing the casting ceramic and cross-linking the epoxy resin by subjecting the casting ceramic to a first heat treatment at from 80° C. to 100° C. for from 4 to 5 hours for causing a setting reaction and subsequently subjecting the casting ceramic to a second heat treatment at from 160° to 200° C. for from 8 to 10 hours for drying the casting ceramic.

7. The process according to claim 1, which further comprises mixing at least one polyhydric alcohol in the form of glycerol into the casting ceramic, to improve processability of the casting ceramic.

* * * * *